United States Patent
Brewer

[11] 4,015,326
[45] Apr. 5, 1977

[54] METHOD OF MOUNTING A STRAIN GAGE TO A SURFACE

[75] Inventor: Given A. Brewer, Marion, Mass.

[73] Assignee: Brewer Engineering Laboratories, Inc., Marion, Mass.

[22] Filed: Dec. 5, 1975

[21] Appl. No.: 637,888

Related U.S. Application Data

[62] Division of Ser. No. 550,516, Feb. 18, 1975, U.S. Pat. No. 3,940,730.

[52] U.S. Cl. .................................... 29/460; 219/92
[51] Int. Cl.² ........................................... B23P 3/00
[58] Field of Search ............... 29/458, 460; 219/92; 73/88.5 SD; 338/2

[56] References Cited
UNITED STATES PATENTS

| | | | |
|---|---|---|---|
| 2,357,578 | 9/1944 | Brownback | 29/460 X |
| 2,363,181 | 11/1944 | Howland | 338/2 |
| 3,188,731 | 6/1965 | Sweeney | 29/460 X |
| 3,214,564 | 10/1965 | Katzer et al. | 219/92 |
| 3,300,854 | 1/1967 | Jackson et al. | 219/92 X |
| 3,475,712 | 10/1969 | Brown | 338/2 |
| 3,599,139 | 8/1971 | Low | 338/2 |
| 3,609,624 | 9/1971 | Nagy | 338/2 |
| 3,639,875 | 2/1972 | Brewer | 338/2 |
| 3,863,192 | 1/1975 | Grey | 338/2 |

Primary Examiner—Charlie T. Moon

[57] ABSTRACT

A strain-deformable wire resistance strain gage is cemented to a ship's propeller or turbine blade, and covered with a water vapor curable silicone plastic polymer protective layer in an unset state; and metal screen overlay is track-welded with the aid of sheet metal strips through the unset silicone plastic to the propeller or turbine blade, after which the protective layer is air cured, forming a seal around the welds and the gage.

3 Claims, 6 Drawing Figures

METHOD OF MOUNTING A STRAIN GAGE TO A SURFACE

This is a division of application Ser. No. 550,516, filed Feb. 18, 1975, now Pat. No. 3,940,730.

This invention relates to strain gages. More particularly, it relates to strain gage assemblies suitable for use on ship's propellers, hulls, and steam and water turbines.

In the past, many attempts have been made to provide a method of attaching a strain gage to a ship's propeller or hull or tubine blade such that the gage remains operable in spite of repeated flexings and prolonged vibrations of the structure to which it is attached, as well as erosion caused by water or steam flowing rapidly past the gage, and the corrosive effects of a salt water environment. Previously it has been attempted to use epoxies or synthetic rubbers to seal out moisture from the strain gage, since even the slightest leak will cause loss of the strain measurements. However, while success has been attained in use on ship hulls, few of the previously attempted solutions have provided a sufficiently durable seal to be of practical value on a propeller.

A satisfactory construction of strain gage assembly is shown, for example, in U.S. Pat. No. 3,639,875, "Strain Gage Assembly and Method of Attachment", issued Feb. 1, 1972 and assigned to the same assignee as the present application. However, this construction is limited to the use of waterproofing compounds that are heat-settable, or cured by a catalyst included in the waterproofing layer, since the sheet metal overlay, which protects the waterproofing layer and the gage within it, effectively isolates the unset layer of waterproofing compound from the atmosphere. Hence compounds that require exposure to external media such as substances in the ambient atmosphere for their cure cannot be used in the structure disclosed in U.S. Pat. No. 3,639,875.

Certain silicone compounds such as RTV silicone rubber offer particular advantages for use as waterproofing layers in marine environments and in environments with high temperature steam, since these compounds offer good resistance to moisture. In addition, they are curable at room temperature, but they remain flexible and rubbery at temperatures up to 450° F. However, these compounds must be cured by exposure to water vapor, such as is present in the ambient atmosphere. Hence, the construction disclosed in U.S. Pat. No. 3,639,875 cannot employ these compounds, or other compounds requiring exposure to external media for their cure.

It is therefore an object of this invention to provide a novel and improved method of attaching a strain gage to an underlying structure such as a ship hull, propeller, or turbine blade in which strain or deformation is to be monitored, that employs a waterproofing layer curable by exposure to external media such as the ambient atmosphere. It is a further object to provide a strain gage attachment that remains firm and reliable through prolonged use in a corrosive environment such as salt water.

It is also an object to provide a strain gage assembly that is flexible and durable when attached to a structure subject to repeated flexing and prolonged vibration.

It is a further object to provide a strain gage assembly that operates reliably despite the effects of water flowing rapidly and forcefully over the assembly.

It is still aother object to provide a strain gage assembly that remains moisture proof at temperatures up to 450° F.

The invention features a method of attaching a strain gage to a surface of a metallic object such as a hull or propeller by cementing the gage to the structure, covering the gage with a protective barrier layer of silicone plastic in an unset state and curable by exposure to an external medium, preferably present in the ambient atmosphere, placing over the unset protective layer an apertured metallic overlay member, preferably a screen, placing a sheet metal strip over the margins of the member and welding the metal strip through the member and the protective barrier layer to the underlying surface. The silicone plastic is then set and cured by exposure to the external medium, such as is present in the ambient air, through the openings of the screen.

In preferred embodiments the silicone plastic is a water vapor curable polymer and the apertured metallic overlay member is a stainless steel mesh.

Other objects, features and advantages will appear from the following description of a preferred embodiment of the invention taken together with the attached drawings thereof, in which.

Figure 1:
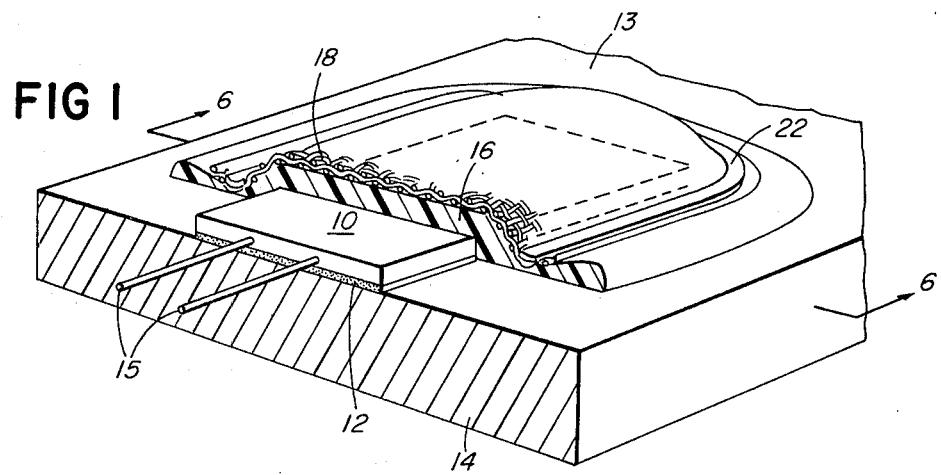
FIG. 1 is a perspective view of a strain gage assembly constructed according to the method of the invention, partially cut away.
Figure 2:
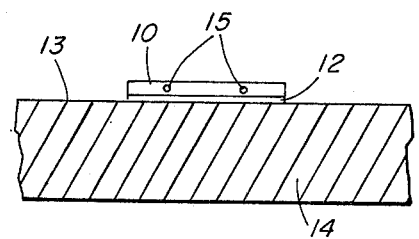
FIGS. 2, 3, 4 and 5 show the assembly at successive stages of construction according to the method of the invention.
Figure 3:
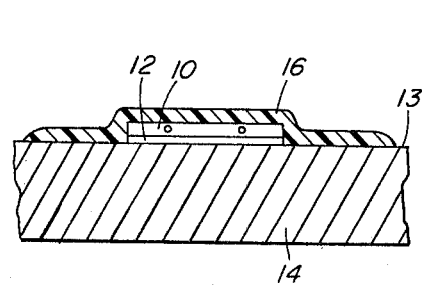
Figure 5:
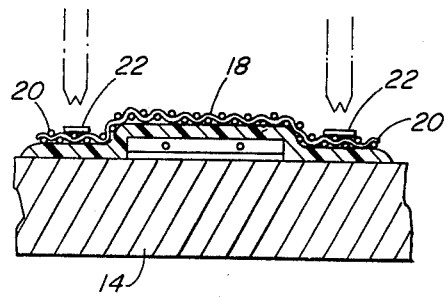

Referring now to the drawings, strain or deformation is to be monitored in a structure 14, which may be, for example, a ship's hull or propeller. The strain gage is to be attached to surface 13 of propeller 14. For this purpose surface 13 must first be prepared by removing all foreign matter, such as paint, oxide, scale, and the like, by use of a disc sander, leaving surface 13 smooth. The surface is next cleaned with tissue saturated with methyl ethyl ketone (M.E.K.). The areas to which the gage and the lead wires are to be attached are then grit blasted with no. 80 aluminous oxide grit, after which the surface is again cleaned with tissue saturated with M.E.K. The location of the gage is then marked, and the surface again is cleaned with M.E.K. A chemical cleaner such as that sold under the trade name "Solox" by U.S. Industrial Chemical Co. is then applied to the area with a cotton swab and removed with a single stroke of clean tissue. The surface must be dry and at a temperature of 60° to 100° F. A strain-deformable resistance wire strain gage 10 is then cemented to surface 13 by a layer of cement 12, which may be any of several suitable compounds, for example, that known in the trade as BR610. Lead wires 15 are then attached to the terminals of strain gage 10.

A protective barrier layer of ambient water vapor curable silicone plastic, such as Dow Corning RTV Silastic 732, is now to be deposited over strain gage 10. For this purpose, the area of the gage and of the underlying propeller to be covered by the barrier layer are prepared by a thorough cleansing with methyl ethyl ketone and Solox. Next, the areas not intended to be covered by the barrier layer are masked, leaving an area for application extending approximately one inch around strain gage 10 and approximately one-half inch around lead wires 15.

Figure 4:
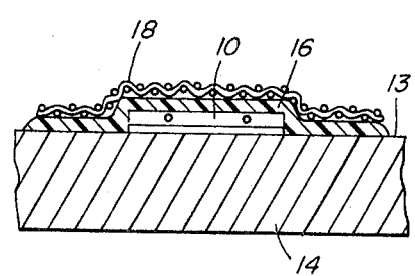

The silicone plastic layer 16 is now applied, in a liquid state, to the area left exposed by the masking. The mask is removed while the layer is still viscous, and the metallic screen overlay 18 is placed over layer 16 (FIG. 4). Screen 18 is of stainless steel screening of mesh size 70/inch and of 0.017 inch thick wire. Screening of mesh size 40/inch to 325/inch may be used. The overlay for gage 10 should be of dimensions to provide side flange portions 20 extending approximately to the edge of layer 16; overlays for lead wires 15, not separately shown in the drawings, should extend to the edge layer covering wires 15. The openings in screen overlay 18 allow ambient air to reach layer 16 to insure proper curing and setting.

Figure 6:
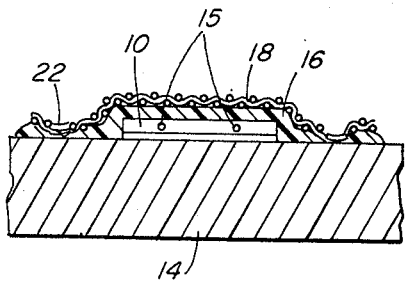
FIG. 6 is a cross-sectional view taken on the lines 6—6 of FIG. 1.

Since it is difficult or impossible to weld screening to a surface such as surface 13, stainless steel shimstock 22 is placed over flange portions 20 of screen 18. Stock of 0.005 inch thick and of a width less than that of flange 20 has been found suitable. Pressure is now applied along shimstock 22 to squeeze out excess liquid silicone plastic, and the shimstock 22 is tack welded through screen 18 to surface 13 using a welder adjusted to about 30 watt seconds. Two rows of spots 21 (FIG. 1) are welded as close together as possible around the entire installation (FIG. 6). The silicone plastic of layer 16 will cure at room temperature in about 24 hours.

After the steps of this process have been completed, the resulting strain gage assembly comprises strain-deformable resistance wire strain gage 10 cemented to surface 13 of propeller 14, a protective barrier of cured silicone plastic deposited in layer 16 completely covering the exposed surface of gage 10 and extending beyond the gage over a portion of surface 13 and a stainless steel screen overlay covering the protective layers and welded through them to the underlying propeller. The layer 16 provides an effective void-free seal surrounding each weld spot, while the screen overlay is securely attached to the propeller and protects the protective layer, gage 10, and lead wires 15 from abrasion.

What is claimed is:

1. The method of attaching a strain-deformable resistance wire strain gage to a surface of a metallic structure in which strain is to be monitored, comprising the following steps:
    a. cementing said strain gage to said structure surface
    b. placing over said strain gage a protective barrier layer of curable silicone plastic in an uncured state, completely covering the exposed surface of said strain gage and extending therebeyond over a portion of said structure surface,
    c. placing over said silicone plastic barrer layer an apertured metallic overlay member covering that portion of said barrier layer that covers said strain gage and providing flange portions adjacent thereto
    d. placing a sheet metal strip over said flange portions
    e. welding said sheet metal strip through said apertured metallic overlay member and through said uncured protective barrier layer to said surface of said structure by pressing at least a part of said sheet metal strip into conductive contact with said flange portions and with said underlying structure surface and causing an electric current to flow through said part to said surface
    said silicone plastic protective barrier being thereafter cured by exposure to a curing medium through said apertured metallic overlay member to provide a void-free seal around said welds and said gage.

2. The method of claim 1 wherein said curable silicone plastic is curable by exposure to water vapor in the ambient atmosphere.

3. The method of claim 1 wherein said apertured metallic overlay member is stainless steel screen of mesh 40/inch to 325/inch.

* * * * *